US005219637A

United States Patent [19]

Arai et al.

[11] Patent Number: 5,219,637

[45] Date of Patent: Jun. 15, 1993

[54] THERMOSENSITIVE STENCIL PAPER

[75] Inventors: Fumiaki Arai, Mishima; Masayasu Nonogaki, Numazu; Shoichi Sugiyama, Gotenba; Yuji Natori, Numazu; Hideyuki Yamaguchi, Shizuoka, all of Japan

[73] Assignee: Ricoh Company, Ltd., Tokyo, Japan

[21] Appl. No.: 816,223

[22] Filed: Jan. 3, 1992

[30] Foreign Application Priority Data

Jan. 8, 1991 [JP] Japan ................................ 3-011564

[51] Int. Cl.$^5$ ................................................ B32B 9/00

[52] U.S. Cl. .................................... 428/195; 428/212; 428/262; 428/327; 428/409; 428/913; 428/914

[58] Field of Search ............... 428/195, 212, 409, 913, 428/914, 327, 262; 101/453

[56] References Cited

U.S. PATENT DOCUMENTS 4,957,808 8/1990 Arai et al. .......................... 428/262

4,974,513 12/1990 Yamane et al. ..................... 101/453

*Primary Examiner*—Patrick J. Ryan

*Assistant Examiner*—W. Krynski

*Attorney, Agent, or Firm*—Oblon, Spivak, McClelland, Maier & Neustadt

[57] ABSTRACT

A thermosensitive stencil paper is composed of a thermosensitive stencil film and an overcoat layer formed thereon which contains a higher-alcohol-ester-modified silicone oil as a sticking-prevention agent. A porous substrate may be attached to the back side of the stencil film by use of an adhesive agent.

5 Claims, No Drawings

THERMOSENSITIVE STENCIL PAPER

BACKGROUND OF THE INVENTION

1. Field of the Invention

The present invention relates to a thermosensitive stencil paper for printing, and more particularly to a thermosensitive stencil paper capable of producing high quality images, without causing the problem of sticking to a thermal head during the preparation of printing masters.

2. Discussion of Background

Conventionally, many patent applications directed to the prevention of the sticking of thermosensitive stencil papers to a thermal head during the preparation of printing masters have been filed. More specifically, these thermosensitive stencil papers are prepared by laminating a thermoplastic film such as a crystallized polyester film with a thickness of about 2 μm and a melting point of 245° to 260° C. on a porous substrate, and a variety of overcoat layers comprising a sticking-prevention agent on the polyester film.

For example, the following overcoat layers have been proposed:

(1) an overcoat layer comprising a metal salt of a fatty acid (Japanese Laid-Open Patent Application 60-19592);

(2) an overcoat layer comprising a phosphate surface active agent (Japanese Laid-Open Patent Applications 61-102294, 61-102295, 61-114893, 61-114894 and 61-125897);

(3) an overcoat layer comprising a room-temperature-curing silicone varnish (Japanese Laid-Open Patent Application 58-153697); and (4) an overcoat layer comprising an ultraviolet-curing silicone varnish (Japanese Laid-Open Patent Application 61-295098).

Even when any of the above-mentioned overcoat layers comprising the sticking-prevention agent is provided, however, the effect of preventing the sticking problem deteriorates with time. In particular, the sticking problem often occurs when the overcoat layer is melted corresponding to a solid image formed on an original under application of the thermal energy from a thermal head to the overcoat layer. The overcoat layer tends to stick to the thermal head, and as a result, the thermoplastic film is peeled from the porous substrate. In addition, when part of the thermoplastic film sticks to the thermal head, the frictional resistance between the stencil paper and the surface of the thermal head is increased, so that the stencil paper cannot be smoothly transported. Consequently, the image obtained on the stencil paper substantially shrinks in comparison with the image of the original. Thus, the dimensional reproduction performance of the image formed on the printing master is degraded. Furthermore, the thermosensitive stencil paper becomes creased when transported on a platen roller for printing operation.

Furthermore, as disclosed in Japanese Laid-Open Patent Application 62-282983, a high-sensitivity film is proposed to prepare a printing master at high speed with low energy. This type of film, which is made of a polyester resin or polyamide resin, has a thickness of 5 μm or more and is singly used as a stencil without attaching it to a porous substrate.

Such a high-sensitivity film tends to readily cause the sticking problem as compared with the aforementioned thermosensitive stencil paper comprising the crystallized polyester film when used to make a printing master. To solve the sticking problem, therefore, there are conventionally proposed high-sensitivity films comprising as a sticking-prevention agent a variety of materials, such as an amino-modified silicone oil (Japanese Laid-Open Patent Application 1-238992), an ester-modified silicone oil (Japanese Laid-Open Patent Application 1-237196), and a mercapto-modified silicone oil (Japanese Laid-Open Patent Application 2-89694). However, the effect of preventing the sticking problem by us of these sticking-prevention agents deteriorates with time and these conventional sticking-prevention agents are unsatisfactory for use in practice.

SUMMARY OF THE INVENTION

Accordingly, an object of the present invention is to provide a thermosensitive stencil paper, free from the conventional shortcomings, which can be used for making a printing master without causing the sticking problem stably over an extended period of time.

The above-mentioned object of the present invention can be achieved by a thermosensitive stencil paper comprising a thermosensitive stencil film and an overcoat layer formed thereon which comprises a higher-alcohol-ester-modified silicone oil, or a thermosensitive stencil paper comprising a porous substrate, a thermosensitive stencil film formed thereon and an overcoat layer formed on the thermosensitive stencil film, which overcoat layer comprises the higher-alcohol-ester-modified silicone oil.

DESCRIPTION OF THE PREFERRED EMBODIMENTS

The higher-alcohol-ester-modified silicone oil for use in the overcoat layer of the thermosensitive stencil paper according to the present invention is represented by the following formula, but is not limited thereto:

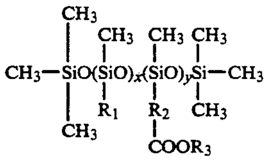

wherein $R_1$ represents $-C_nH_{2n+1}$ (n=0 to 20) or

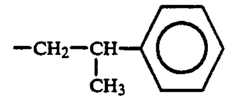
;

$R_2$ represents an alkylene group having 1 or more carbon atoms; $R_3$ represents an alkyl group having 5 or less carbon atoms; and x and y are integers of 1 or more.

The aforementioned higher-alcohol-ester-modified silicone oil has excellent boundary lubricating properties because it has an alkyl higher alcohol ester group therein, so that the thermosensitive stencil paper according to the present invention is free from the problem of sticking to a thermal head.

As the higher-alcohol-ester-modified silicone oil, for example, a commercially available silicone oil (Trademark "SF8422", made by Dow Corning Toray Silicone Co.,. Ltd.) can be employed in the present invention.

In the present invention, as the overcoat layer to be provided on the thermosensitive stencil film, for instance, the previously mentioned high-sensitivity film as disclosed in Japanese Laid-Open Patent Application 62-282983, and a conventional thermosensitive film for use in the thermosensitive stencil paper such as a crystallized polyester film can be employed.

The thermosensitive stencil film for use in the present invention may be attached to a porous substrate. In this case, natural fiber and synthetic fiber such as polyester, vinylon or nylon are employed singly or in combination for the porous substrate with a mesh structure. The basis weight of the porous substrate is preferably 5 to 15 $g/m^2$.

Furthermore, the thermosensitive stencil film and the porous substrate can be laminated with any adhesives which are conventionally used for this kind of thermosensitive stencil paper.

Other features of this invention will become apparent in the course of the following description of exemplary embodiments, which are given for illustration of the invention and are not intended to be limiting thereof.

EXAMPLE 1

A crystallized polyester film with a thickness of 2 μm and a porous substrate made of Manila hemp with a basis weight of 10 $g/m^2$ were laminated with an adhesive agent comprising a vinyl chloride - vinyl acetate copolymer in a deposition amount of 1.5 $g/m^2$ on a dry basis.

A 0.5% toluene solution of a commercially available higher-alcohol-ester-modified silicone oil (Trademark "SF8422", made by Dow Corning Toray Silicone Co., Ltd.) was coated on the above-prepared crystallized polyester film by a smoothing bar and dried at 50° C. for 30 seconds, so that an overcoat layer was formed on the polyester film.

Thus, a thermosensitive stencil paper according to the present invention was obtained.

COMPARATIVE EXAMPLE 1

The procedure for the preparation of the thermosensitive stencil paper in Example 1 was repeated except that the 0.5% toluene solution of the higher-alcohol-ester-modified silicone oil used in Example 1 as the coating liquid for the overcoat layer was replaced by a 0.5% isopropyl alcohol (IPA) solution of a commercially available polyether modified silicone oil (Trademark "KF352", made by Shin-Etsu Chemical Co., Ltd.), whereby a comparative thermosensitive stencil paper was obtained.

COMPARATIVE EXAMPLE 2

The procedure for the preparation of the thermosensitive sensitive stencil paper in Example 1 was repeated except that the 0.5% toluene solution of the higher-alcohol-ester-modified silicone oil used in Example 1 as the coating liquid for the overcoat layer was replaced by a 0.5% isopropyl alcohol (IPA) solution of a commercially available amino modified silicone oil (Trademark "KF864", made by Shin-Etsu Chemical Co., Ltd.).

Thus, a comparative thermosensitive stencil paper was obtained.

COMPARATIVE EXAMPLE 3

The procedure for the preparation of the thermosensitive stencil paper in Example 1 was repeated except that the 0.5% toluene solution of the higher-alcohol-ester-modified silicone oil used in Example 1 as the coating liquid for the overcoat layer was replaced by a 0.5% toluene solution of a commercially available alkyl modified silicone oil (Trademark "SF8416", made by Dow Corning Toray Silicone Co., Ltd.), whereby a comparative thermosensitive stencil paper was obtained.

The thermosensitive stencil papers thus obtained in Example 1 and Comparative Examples 1 to 3 were stored in a thermostatic chamber at 50° C. for 3 weeks.

After 3 weeks, each thermosensitive stencil paper was subjected to a image formation test and the following items were evaluated.

(1) Shrinkage of a solid image formed on a printing master (Dimensional reproduction performance)

Each thermosensitive stencil paper was wound around a drum of a commercially available printing machine (Trademark "Priport SS 850G", made by Ricoh Company, Ltd.) to prepare a printing master in a character mode by using a test chart carrying a 140 mm×250 mm solid image.

Using the above-prepared printing master, a solid image was printed on 20 sheets of paper. In such a manner, ten printing masters were prepared, and copy-making was performed on 20 sheets of paper using each printing master. The length of the solid image printed on the 20th sheet when the tenth printing master was used was measured and the shrinkage ratio of the solid image was calculated in accordance with the following formula:

$$\text{Shrinkage ratio (\%)} = \frac{(140 - \text{the length of solid image printed on the 20th sheet})}{140} \times 100$$

(2) Crease on the thermosensitive stencil paper

Each thermosensitive stencil paper was wound around a drum of a commercially available printing machine (Trademark "Priport SS 850G", made by Ricoh Company, Ltd.) to prepare ten printing masters in a character mode by using a test chart carrying a 140 mm×250 mm solid image.

The formation of creases in the thermosensitive stencil paper when transported on a platen roller in the printing machine was visually inspected and evaluated in accordance with the following scale:

○: the thermosensitive stencil paper did not become creased.

Δ: the thermosensitive stencil paper slightly became creased.

×: the thermosensitive stencil paper became considerably creased.

(3) Peeling of the polyester film from the porous substrate

Each thermosensitive stencil paper was wound around a drum of a commercially available printing machine (Trademark "Priport SS 850G", made by Ricoh Company, Ltd.) to prepare ten printing masters in a character mode by using a test chart carrying a 140 mm×250 mm solid image.

In the course of preparing the printing masters, the peeling of the crystallized polyester film from the porous substrate was visually inspected and evaluated in accordance with the following scale:

○: the polyester film was not peeled from the substrate.

Δ: the polyester film was slightly peeled from the substrate.

×: the polyester film was completely peeled from the substrate.

The results of the image formation test are shown in Table 1.

TABLE 1

| | Shrinkage of Solid image on Printing Master | Crease on Thermosensitive Stencil Paper | Peeling of Polyester Film from Substrate |
|---|---|---|---|
| Ex.1 | 0.36% | ∘ | ∘ |
| Comp. Ex.1 | 10.7% | x | x |
| Comp. Ex.2 | 7.1% | Δ | Δ |
| Comp. Ex.3 | 5.7% | Δ | ∘ |

As can be seen from the results shown in Table 1, when the printing master is prepared by using the thermosensitive stencil paper according to the present invention, a solid image can be properly formed on the printing master with a minimized decrease in the dimensional reproduction performance. In addition, the thermosensitive stencil paper of the present invention wound around the drum does not become creased when transported on the platen roller in the printing machine, and the polyester film is not peeled from the porous substrate in the course of preparing the printing masters.

EXAMPLE 2

A commercially available high-sensitivity polyester film {made by Asahi Chemical Industry Co., Ltd.), with a degree of crystallization of 30% or less and a thickness of 1.9 μm, and a porous substrate made of Manila hemp and polyester fiber at a mixing ratio of 70:30, with a basis weight of 11 $g/m^2$ were laminated by use of an adhesive agent comprising a vinyl chloride - vinyl acetate copolymer in a deposition amount of 1.5 $g/m^2$ on a dry basis.

Formation of Overcoat Layer

The following components were mixed to prepare a coating liquid for an overcoat layer:

| | Parts by Weight |
|---|---|
| 30% mixed solvent (methyl ethyl ketone and methyl isobutyl ketone) of acrylic silicone resin (Trademark "SX705", made by Toagosei Chemical Industry Co., Ltd.) | 0.187 |
| Higher-alcohol-modified silicone oil (Trademark "SF8422", made by Dow Corning Toray Silicone Co., Ltd.) | 0.224 |
| 35% aqueous solution of antistatic agent (Trademark "Nissan Elegan A264", made by Nippon Oils and Fats Co., Ltd. | 0.630 |
| IPA | 49.48 |
| Toluene | 49.47 |

The above-prepared coating liquid for the overcoat layer was coated on the polyester film and dried at 50° C., so that an overcoat layer was formed on the polyester film.

Thus, a thermosensitive stencil paper according to the present invention was obtained.

EXAMPLES 3 TO 5

The procedure for the preparation of the thermosensitive stencil paper in Example 2 was repeated except that the respective components in the formulation for the overcoat layer coating liquid prepared in Example 2 were changed as shown in Table 2.

Thus, thermosensitive stencil papers according to the present invention were obtained.

COMPARATIVE EXAMPLE 4

The procedure for the preparation of the thermosensitive stencil paper in Example 2 was repeated except that the respective components in the formulation for the overcoat layer coating liquid prepared in Example 2 were changed as shown in Table 2.

Thus, a comparative thermosensitive stencil paper was obtained.

TABLE 2

| Formulation for Overcoat Layer | Ex. 3 | Ex. 4 | Ex. 5 | Comp Ex. 4 |
|---|---|---|---|---|
| 30% mixed solvent (MEK and MIK)* of acrylic silicone resin "SX705" | 0.560 | 0.747 | 0.84 | 0.933 |
| Higher-alcohol-modified silicone oil "SF8422" (Trademark) | 0.112 | 0.056 | 0.028 | — |
| 35% aqueous solution of antistatic agent "Nissan Elegan A264" (Trademark) | 0.630 | 0.630 | 0.630 | 0.630 |
| IPA | 49.35 | 49.28 | 49.25 | 49.22 |
| Toluene | 49.35 | 49.28 | 49.25 | 49.22 |
| | | (unit: parts by weight) | | |

*MEK = methyl ethyl ketone
MIK = methyl isobutyl ketone

COMPARATIVE EXAMPLE 5

The procedure for the preparation of the thermosensitive stencil paper in Example 3 was repeated except that the higher-alcohol-modified silicone oil (Trademark "SF8422", made by Dow Corning Toray Silicone Co., Ltd.) in the formulation for the overcoat layer coating liquid prepared in Example 3 was replaced by a commercially available alkyl modified silicone oil (Trademark "KF410", made by Shin-Etsu Chemical Co., Ltd.), whereby a comparative thermosensitive stencil paper was obtained.

EXAMPLE 6

A commercially available amorphous high-sensitivity polyester film (made by Asahi Chemical Industry Co., Ltd.), with a degree of crystallization of 30% or less and a thickness of 1.9 μm, and a porous substrate made of Manila hemp and polyester fiber at a mixing ratio of 70:30, with a basis weight of 11 $g/m^2$ were laminated by use of an adhesive agent comprising a vinyl chloride - vinyl acetate copolymer in a deposition amount of 1.5 $g/m^2$ on a dry basis.

Formation of Overcoat Layer

The following components were mixed to prepare a coating liquid for an overcoat layer:

| | Parts by Weight |
|---|---|
| 10% aqueous solution of | 1.25 |

-continued

| | Parts by Weight |
|---|---|
| fluoroplastic (Trademark "Daifree EM810", made by Daikin Industries, Ltd.) | |
| 40% emulsion of higher-alcohol-modified silicone oil (Trademark "SF8422", made by Dow Corning Toray Silicone Co., Ltd.) | 0.313 |
| 35% aqueous solution of antistatic agent (Trademark "Nissan Elegan A264", made by Nippon Oils and Fats Co., Ltd.) | 0.714 |
| Water | 99.723 |

The above-prepared coating liquid for the overcoat layer was coated on the polyester film and dried at 50° C., so that an overcoat layer was formed on the polyester film.

Thus, a thermosensitive stencil paper according to the present invention was obtained.

In Examples 2 to 6 and Comparative Examples 4 and 5, two thermosensitive stencil papers were prepared. One stencil paper was subjected to an image formation test immediately after the preparation thereof and the other was subjected to the same test after stored in a thermostatic chamber at 50° C. for 3 weeks.

In the image formation test, each thermosensitive stencil paper was wound around a drum of a commercially available printing machine (Trademark "Priport SS 850G", made by Ricoh Company, Ltd.), and ten printing masters were continuously prepared by using a test chart under the application of a thermal energy of 0.07 mJ/dot from a thermal head with a density of 16 dots/mm.

In the course of the preparation of the printing masters, the peeling of the high-sensitivity polyester film from the porous substrate due to the sticking problem was visually inspected.

The results of the image formation test are shown in Table 3.

TABLE 3

| | Immediately after Preparation of Thermosensitive Stencil Paper | After Storage at 50° C. for 3 Weeks |
|---|---|---|
| Ex. 2 | Polyester film was not peeled from substrate. | Polyester film was not peeled from substrate. |
| Ex. 3 | Same as above. | Same as above. |
| Ex. 4 | Same as above. | Same as above. |
| Ex. 5 | Same as above. | Same as above. |
| Ex. 6 | Same as above. | Same as above. |
| Comp. Ex. 4 | Same as above. | Polyester film was peeled from substrate in preparing the 2nd printing master. |
| Comp. Ex. 5 | Same as above. | Polyester film was peeled from substrate in preparing the 3rd printing master. |

As is apparent from Table 3, the polyester film is not peeled from the porous substrate at all in preparing the printing masters when the thermosensitive stencil papers according to the present invention are used. Therefore, the printing operation can be carried out satisfactorily by using the above-prepared printing masters.

As previously explained, when the printing masters are prepared by using the thermosensitive stencil papers according to the present invention, the dimensional reproduction performance of a solid image can be improved and the sticking problem can be effectively prevented. This is because the thermosensitive stencil paper of the present invention comprises the overcoat layer comprising a higher-alcohol-modified-silicone oil as a sticking-prevention agent.

What is claimed is:

1. A thermosensitive stencil paper comprising a thermosensitive stencil film and an overcoat layer formed thereon which comprises a higher-alcohol-ester modified silicone oil.

2. The thermosensitive stencil paper as claimed in claim 1, further comprising a porous substrate, which is attached to the back side of said thermosensitive stencil film opposite to said overcoat layer.

3. The thermosensitive stencil paper as claimed in claim 1, wherein said higher-alcohol-ester-modified silicone oil for use in said overcoat layer is represented by formula:

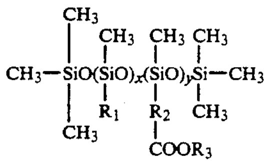

wherein $R_1$ represents $-C_nH_{2n+1}$ ($n=0$ to 20) or

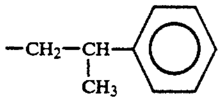
;

$R_2$ represents an alkylene group having 1 or more carbon atoms; $R_3$ represents an alkyl group having 5 or less carbon atoms; and each of x and y is an integer of 1 or more.

4. The thermosensitive stencil paper as claimed in claim 1, wherein said thermosensitive stencil film is attached to a porous substrate.

5. The thermosensitive stencil paper as claimed in claim 4, wherein said porous substrate has a basis weight of 5-15 g/m².

* * * * *